United States Patent
Hirotsu et al.

(10) Patent No.: US 7,904,626 B2
(45) Date of Patent: Mar. 8, 2011

(54) ARBITER AND ARBITRATION METHOD OF MULTIPLE DATA ACCESSES

(75) Inventors: Teppei Hirotsu, Hitachi (JP); Kotaro Shimamura, Hitachinaka (JP); Teruaki Sakata, Tokai (JP); Noboru Sugihara, Kokubunji (JP)

(73) Assignee: Renesas Electronics Corporation, Kawasaki-shi (JP)

( * ) Notice: Subject to any disclaimer, the term of this patent is extended or adjusted under 35 U.S.C. 154(b) by 341 days.

(21) Appl. No.: 12/134,038

(22) Filed: Jun. 5, 2008

(65) Prior Publication Data
US 2009/0024777 A1    Jan. 22, 2009

(30) Foreign Application Priority Data
Jun. 7, 2007    (JP) .................. 2007-152037

(51) Int. Cl.
G06F 12/00    (2006.01)
(52) U.S. Cl. ....................... 710/244; 710/117
(58) Field of Classification Search ............... 710/240, 710/241, 243, 244, 116, 117
See application file for complete search history.

(56) References Cited

U.S. PATENT DOCUMENTS

| | | | | |
|---|---|---|---|---|
| 5,748,969 A * | 5/1998 | Lee et al. | | 710/244 |
| 5,802,581 A * | 9/1998 | Nelsen | | 711/151 |
| 6,654,833 B1 * | 11/2003 | LaBerge | | 710/107 |
| 7,380,040 B2 * | 5/2008 | Sarkar et al. | | 710/244 |
| 2007/0136503 A1 * | 6/2007 | Worrell et al. | | 710/240 |

FOREIGN PATENT DOCUMENTS

JP    2003-30134 A    1/2003

* cited by examiner

Primary Examiner — Khanh Dang
(74) Attorney, Agent, or Firm — Miles & Stockbridge P.C.

(57) ABSTRACT

There is provided a technique which reduces an average processing time of low-priority accesses with suppressing an average delay increase of a high-priority access processing even in a case where high-priority access request and a low-request access request are simultaneously generated to a shared access processing unit and high-priority accesses are continuously generated. And, there is provided an access arbitration equipment comprising: an issued access request retention unit; a first interval determination circuit; and a second interval determination circuit. In a case where the first interval determination circuit determines that an interval is generated between an issued access processing and a most prior access processing and a second interval determination circuit determines that no interval is generated between the issued access processing and a second-prior access request, the priority order of the most prior access request and the second-prior access request is changed.

5 Claims, 14 Drawing Sheets

| INPUT | | | OUTPUT |
|---|---|---|---|
| ACCESS REQUEST 1 (111) | ACCESS REQUEST 2 (211) | PRIORITY CHANGE SIGNAL (305) | SELECT SIGNAL (306) |
| REQUESTED | REQUESTED | 0 | 0 |
| REQUESTED | REQUESTED | 1 | 1 |
| REQUESTED | NOT REQUESTED | ? | 0 |
| NOT REQUESTED | REQUESTED | ? | 1 |
| NOT REQUESTED | NOT REQUESTED | ? | 0 |

| INPUT | | OUTPUT | |
|---|---|---|---|
| ACCESS ACKNOWLEDGEMENT (6) | SELECT SIGNAL (306) | ACCESS ACKNOWLEDGEMENT 1 (112) | ACCESS ACKNOWLEDGEMENT 2 (212) |
| 1 | 0 | 1 | 0 |
| 1 | 1 | 0 | 1 |
| 0 | ? | 0 | 0 |

FIG. 8A

ACCESS QUEUE 1

| No. | IDENTIFIER | BANK | ROW ADDRESS | COLUMN ADDRESS |
|---|---|---|---|---|
| 1 | 10 | 0 | 0 | 0 |
| 2 | 11 | 0 | 0 | 4 |
| 3 | 12 | 0 | 1 | 0 |
| 4 | | | | |

FIG. 8B

ACCESS QUEUE 2

| No. | IDENTIFIER | BANK | ROW ADDRESS | COLUMN ADDRESS |
|---|---|---|---|---|
| 1 | 20 | 1 | 1 | 8 |
| 2 | | | | |
| 3 | | | | |
| 4 | | | | |

FIG. 14

| INPUT | | | OUTPUT | |
|---|---|---|---|---|
| ACCESS REQUEST 1 (111) | ACCESS REQUEST 2 (211) | PRIORITY CHANGE SIGNAL (305) | SELECTION SIGNAL (306) | PRIORITY CHANGE ACKNOWLEDGEMENT (1202) |
| REQUESTED | REQUESTED | 0 | 0 | 0 |
| REQUESTED | REQUESTED | 1 | 1 | 1 |
| REQUESTED | NOT REQUESTED | ? | 0 | 0 |
| NOT REQUESTED | REQUESTED | ? | 1 | 0 |
| NOT REQUESTED | NOT REQUESTED | ? | 0 | 0 |

US 7,904,626 B2

ARBITER AND ARBITRATION METHOD OF MULTIPLE DATA ACCESSES

CROSS-REFERENCE TO RELATED APPLICATION

The present application claims priority from Japanese Patent Application No. JP 2007-152037 filed on Jun. 7, 2007, the content of which is hereby incorporated by reference into this application.

TECHNICAL FIELD OF THE INVENTION

The present invention relates to a technique for access arbitration. More particularly, the present invention relates to a technique effectively applied to a system or method of access arbitration for performing an arbitration of multiple data access requests in the case where multiple access requests having different priorities are made to a shared data access processing unit.

BACKGROUND OF THE INVENTION

In recent years, along with progress in high performance and multiple functions of information devices, the amount of data processed by an SoC (Systems on a Chip) equipped in these devices has been increased. To handle such increasing data processings, a configuration where a plurality of data processing units perform data processing in parallel and proceeding the whole processing while transferring the processed data to each other.

In the data transfer among the plurality of data processing units in the SoC, a buffer is provided to a memory to close a gap in data processing timing in the data transfer, thereby performing the data transfer via the buffer. For the memory to which the buffer is allocated, an external memory such as an external SDRAM (Synchronous Dynamic Random Access Memory) to the SoC is generally used for ensuring capacity.

An example of the above-mentioned data processing unit is a video output unit, while an access processing from the video output unit to an SDRAM is required to finish in a specific constant time period according to the characteristic of the display data to be handled. In the following, the access having such a limitation will be called as real-time access.

On the other hand, as another example of the data processing unit, there is a CPU (Central Processing Unit). When the CPU is executing an OS (Operating System), an access from the CPU to an SDRAM is not necessary to be finished in a constant time period as the real-time access, but it is required to be finished as fast as possible. In the following, the access having such property will be called as best-effort access.

As a method of access arbitration for the case where the real-time access request and the best-effort access request mentioned above are spontaneously generated to a same SDRAM, there is generally used a system or method for granting a high priority to the real-time access request and a lower priority than that of the real-time access request to the best-effort access, thereby performing an arbitration of access requests according to the priorities.

While the limitation in processing time given to the high-priority real-time access is fulfilled by using such a system or method of arbitration, when the real-time access requests are many, the low-priority best-effort requests should wait for a long time, and thus there is a problem that the performance of the whole system may be lowered as a result.

To solve the problem, for example, Japanese Patent Application Laid-Open Publication No. 2003-30134 (Patent Document 1) proposes a system or method of arbitration where a low-priority access request is selected according to a predetermined ratio so that the low-priority access request is selected in a constant ratio also when high-priority requests are constantly generated, although a high-priority access request is selected normally.

SUMMARY OF THE INVENTION

Meanwhile, in the technique disclosed in Patent Document 1 described above, an interval caused by replacing row data of the SDRAM may be generated by interposing the low-priority access processing between high-priority access processings. In such a case, there is a problem that, when a high-priority access processing having a previous low-priority access processing interposed prior thereto is significantly delayed, a subsequent low-priority access processing is significantly delayed, therefore the access processing time of the low-priority access may not be shortened on average.

Accordingly, an object of the present invention is to provide a technique for solving the above problems so as to shorten average processing time of low-priority accesses with suppressing an increase in average delay of high-priority access processing even in the case where high-priority access requests and low-priority access-requests are generated simultaneously to a shared access processing unit, and further, when high-priority access requests are constantly generated.

The above and other objects and novel characteristics of the present invention will be apparent from the description of this specification and the accompanying drawings.

The typical ones of the inventions disclosed in this application will be briefly described as follows.

The present invention is applied to a system or method of access arbitration (arbitration circuit (arbiter), arbitration method) for performing an arbitration between a plurality of access requests when a plurality of access requests having different priorities are generated to a shared access processing unit.

In the system of access arbitration, there are provided at least: a issued access request retention unit for retaining an issued access request which is selected as a result of a previous arbitration; an interval determination circuit 1 for determining whether an interval is generated between an issued access processing generated by the issued access request retained by the issued access request retention unit and a highest-priority access processing generated by a highest-priority access request having the highest priority among a plurality of access requests; and an interval determination circuit 2 for determining whether an interval is generated between the issued access processing and a second-highest-priority access processing generated by a second-highest-priority access request having a second-highest priority among the plurality access requests. According to the system or method of access arbitration, in the case where it is determined by the interval determination circuit 1 that an interval is generated between the issued access processing and the highest-priority access processing, and it is determined by the interval determination circuit 2 that no interval is generated between the issued access processing and the sub-highest-priority access processing, the priority order of the highest-priority access request and the second-highest-priority access request are changed.

The effects obtained by typical aspects of the present invention will be briefly described below.

According to the present invention, only in the case where an interval is generated between a highest-priority access processing selected in a normal arbitration and an access processing previous thereto, a low-priority access processing is performed in the interval, thereby shortening an average processing time of a low-priority access request while preventing delay of a high-priority access processing.

BRIEF DESCRIPTIONS OF THE DRAWINGS

FIG. 8A is a diagram showing a storing state of access requests of an access queue 1 upon starting an access request arbitration operation according to the first embodiment of the present invention;

FIG. 8B is a diagram showing a storing state of access requests of an access queue 2 upon starting the access request arbitration operation according to the first embodiment of the present invention;

FIG. 14 is a diagram showing a relationship between an input and an output of the priority order determination circuit according to the second embodiment of the present invention;

Figure 15:
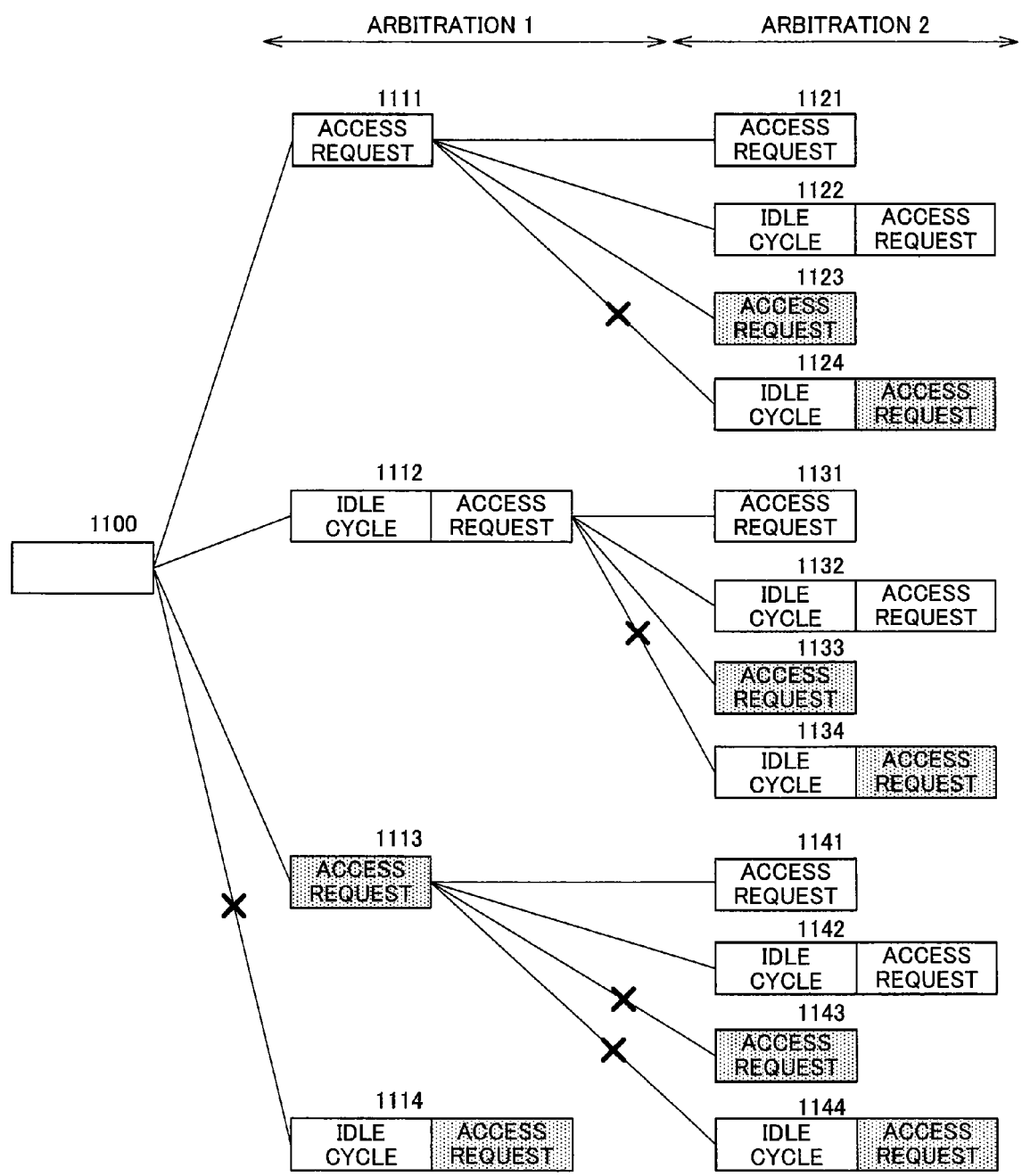
Figure 16:
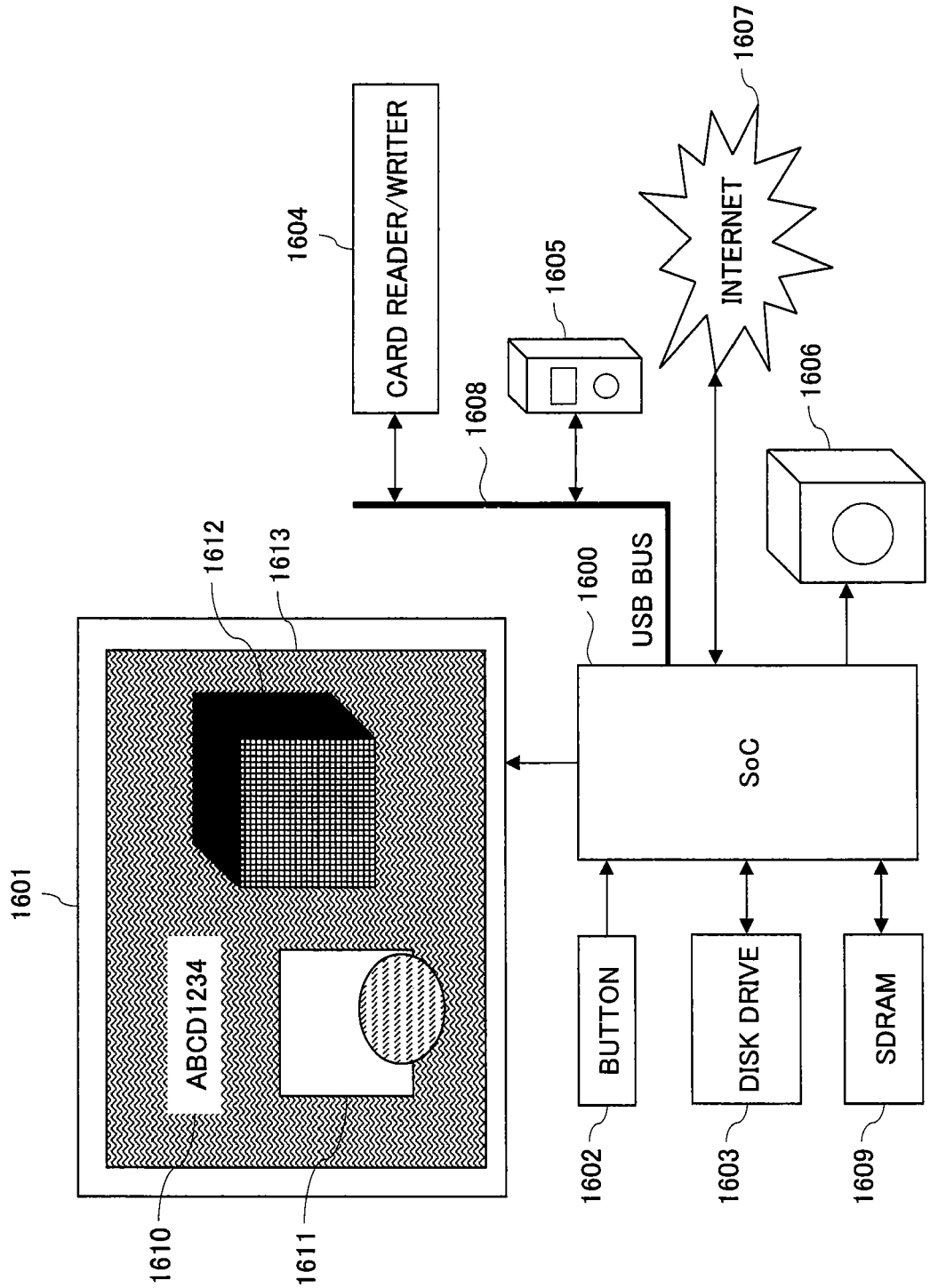

FIG. 15 is a diagram showing exhaustive orders of access requests selected as a result of an access arbitration by an ordered tree, in the case where access requests are constantly outputted to an access request 1 and an access request 2, according to the second embodiment of the present invention; and FIG. 16 is a configuration diagram of an information equipment which includes an SoC using an access arbitration method.

DESCRIPTIONS OF THE PREFERRED EMBODIMENTS

Hereinafter, embodiments of the present invention will be described in detail with reference to the accompanying drawings. Note that, components having the same function are denoted by the same reference symbols throughout the drawings for describing the embodiment, and the repetitive description thereof will be omitted.

First Embodiment

FIG. 16 is a configuration diagram of an information equipment which includes an SoC using an access arbitration system or method (hereinafter, mentioned as access arbitration system 1).

An SoC (1600) is connected to: a display panel (1601) which displays text (1610) and 2D objects (1611) such as rectangles and circles, and 3D objects (1612) such as cubes, texture (1613) etc.; a button (1602) for sending instruction to the SoC (1600) to operate; a disk drive (1603) which reads/writes data from/to a hard disk and media such as CD, DVD and Blu-Ray disc; an SDRAM (1609) which temporarily stores multimedia data and a program etc.; a speaker (1606) which outputs voice or sound; and the internet (1607), and so forth. Further, the SoC (1600) is connected to: a card reader/writer (1604) which reads/writes data from/to a semiconductor memory such as an SD card and a Memory Stick (trade mark); and an external USB device (1605) such as a music player and a voice-input device, and so forth.

The SoC (1600) performs an arbitration of accesses to the SDRAM (1609) from the display panel (1601), the disk drive (1603), the speaker (1606), the internet (1607), the card reader/writer (1604), and the external USB device (1605), etc., and performs processing of data stored in the SDRAM, thereby executing applications such as car navigation system, image/music play, internet browsing, etc.

Figure 1:
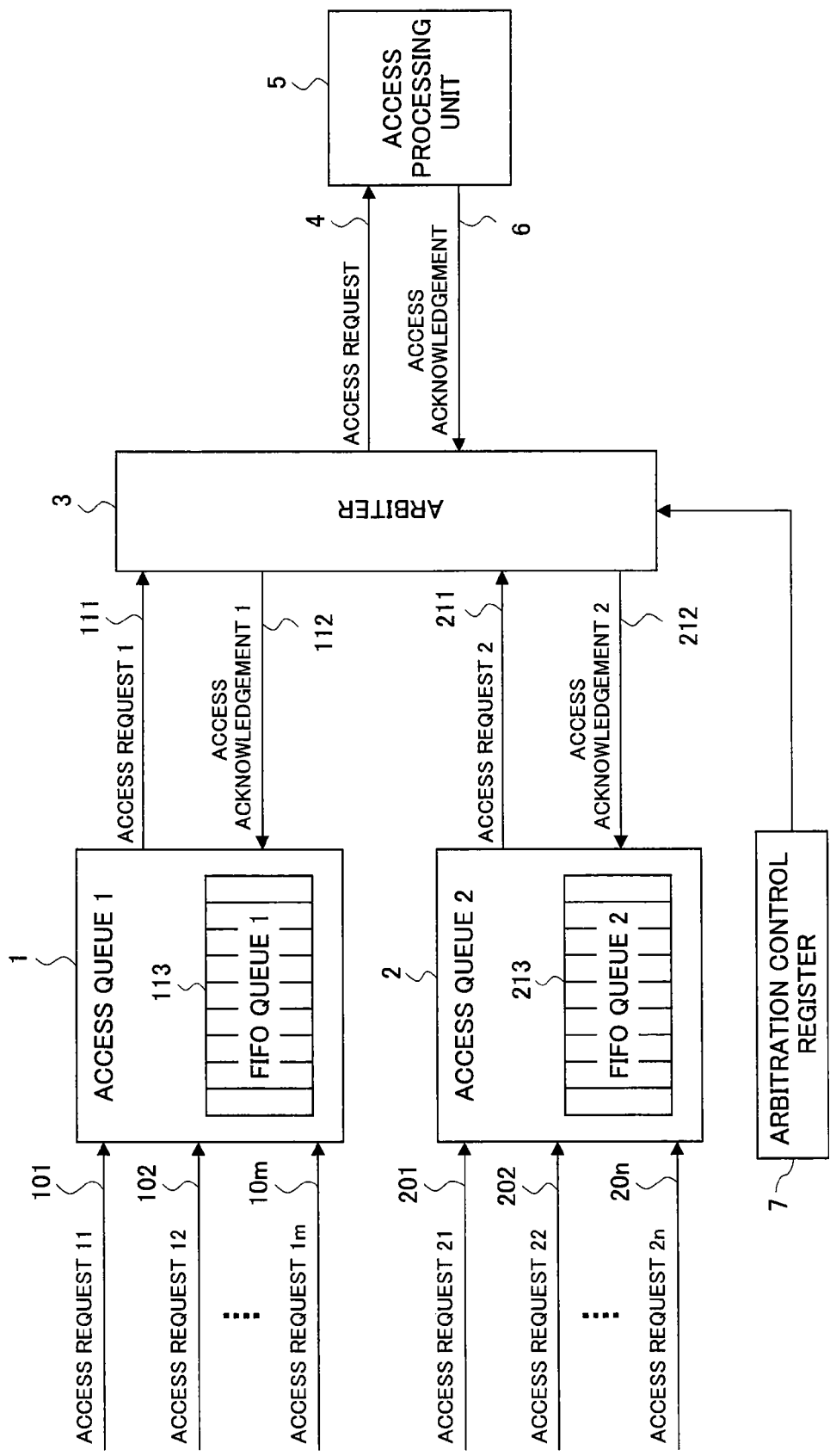
FIG. 1 is an overall view of an access arbitration equipment using an access arbitration system or method according to a first embodiment of the present invention.

FIG. 1 is an overall view showing an access arbitration equipment using the access arbitration system 1. The access arbitration equipment of the present invention comprises: an access queue 1 (1), an access queue 2 (2), an arbiter (3), an access processing unit (5), an arbitration control register (7), and so forth.

The access queue 1 (1) arbitrates a plurality of access requests outputted to an access request 11 (101), access request 12 (102), . . . , and access request 1m (10m). When there is a vacancy in a FIFO (First-In First-Out) queue 1 (113), one access request selected as a result of the arbitration is added to the FIFO queue 1 (113), and when there is no vacancy in the FIFO queue 1 (113), the arbitration is suspended until a vacancy is available. Note that, an arbitration method of the access queue 1 (1) is not limited to a specific method such as a priority method, and an appropriate system or method corresponding to the characteristics of the access request 11 (101), access request 12 (102), . . . , access request 1m (10m) may be adopted.

Further, the access queue 1 (1) outputs a first (head) access request in the FIFO queue 1 (113) to the access request 1 (111). Moreover, when the access queue 1 (1) receives a notice of acknowledgement of the access request which is currently outputted to the access request 1 (111) according to an asserted access acknowledgment 1 (112), the access queue 1 (1) deletes the first access request in the FIFO queue 1 (113) and brings the order of second and subsequent access requests forward sequentially.

The access queue 2 (2) arbitrates a plurality of access requests outputted to an access request 21 (201), access request 22 (202), . . . , and access request 2n (20n) When there is a vacancy in a FIFO (First-In First-Out) queue 2 (213), one access request selected as a result of the arbitration is added to the FIFO queue 2 (213), and when there is no vacancy in the FIFO queue 2 (213), the arbitration is suspended until a vacancy is available. Note that, an arbitration method of the access queue 2 (2) is not limited to a specific method such as a priority method, and an appropriate system or method corresponding to the characteristics of the access request 21 (201), access request 22 (202), . . . , access request 1m (20n) may be adopted.

Further, the access queue 2 (2) outputs a first access request in the FIFO queue 2 (213) to the access request 2 (211). Moreover, when the access queue 2 (2) receives a notice of acknowledgement of the access request which is currently outputted to the access request 2 (211) according to an asserted access acknowledgment 2 (212), the access queue 2 (2) deletes the first access request in the FIFO queue 2 (213) and brings the order of second and subsequent access requests forward sequentially.

According to the present embodiment, the access requests outputted to the access request 11 (101), access request 12 (102), . . . , access request 1m (10m) have priorities higher than those of access requests outputted to the access request 21 (201), access request 22 (202), . . . , access request 2n (20n). Therefore, the access request 1 (111) outputted from the access queue 1 (1) has a higher priority than the access request 2 (211) outputted from the access queue 2 (2).

The arbiter (3) performs an arbitration of two access requests outputted to the access request 1 (111) and the access request 2 (211), and outputs one access request selected as a result of the arbitration to an access request (4). Further, when the arbiter (3) receives a notice of acknowledgement of an access request currently outputted to the access request (4) according to an asserted access acknowledgement, the arbiter (3) asserts the access acknowledgment 1 (112) in the case where an access request outputted to the access request 1 (111) is currently outputted to the access request (4), and the arbiter (3) asserts the access acknowledgment 2 (212) in the case where an access request outputted to the access request 2 (211) is currently outputted to the access request (4).

An arbitration method of access request of the arbiter (3) is selected by a value stored in the arbitration control register (7). An example of a correspondence between a value stored in the arbitration control register (7) and an arbitration system/method to be selected is as follows.

| Stored Value in the Arbitration Control Register (7) | Access Request Arbitration System/Method |
| --- | --- |
| 0 | Priority system |
| 1 | Round-Robin system |
| 2 | Access arbitration system 1 |

Note that, other variations of arbitration system than the access arbitration system 1 and other correspondences of a value stored in the arbitration control register (7) and various arbitration systems are not limited to this example.

While details of the arbiter (3) will be described later with reference to FIG. 2, among arbitration methods to be selected according to the value stored in the arbitration control register (7), only a configuration to achieve the access arbitration system 1 will be described therein, and configurations to achieve other configurations than this will be omitted herein.

When an access request outputted to the access request (4) becomes available to be processed, the access processing unit (5) asserts the access acknowledgment (6) at the same time with retrieving the access request, and thereafter, performs an access processing corresponding to the retrieved access request.

In the present embodiment as an example, while the access request is a read or write request to an SDRAM and an access arbitration equipment is formed on a semiconductor substrate, the present invention is not limited to this, and is applicable to other access requests. Note that, while the access processing unit (5) has a function of outputting data which has been read out from an SDRAM, the descriptions of the present embodiment is focused on an arbitration system of access requests, and descriptions about output of the read data will be omitted.

Figures 5, 6, 7:
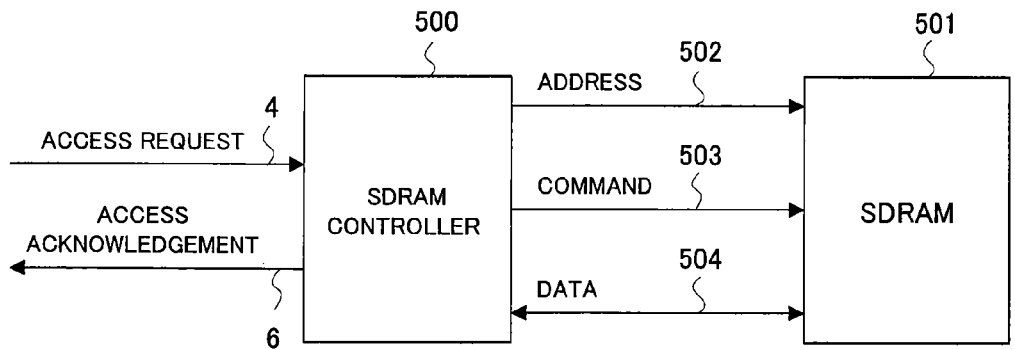
FIG. 5 is a detail view of an access processing unit according to the first embodiment of the present invention.
FIG. 6 is a diagram showing a relationship between an input and an output of the priority change determination circuit according to the first embodiment of the present invention.
FIG. 7 is a diagram showing a relationship between an input and an output of an access acknowledgement generation circuit according to the first embodiment of the present invention.

FIG. 5 is a detail view of the access processing unit (5). The access processing unit (5) comprises an SDRAM controller (500), an SDRAM (501), and so forth.

The SDRAM controller (500) decodes an access request outputted to the access request (4), and appropriately outputs an address (502) and a command (503) to the SDRAM (501) based on an interface specification of the SDRAM so as to perform a read or write processing to the SDRAM corresponding to the decoding.

Further, the SDRAM controller (500) asserts the access acknowledgment (6) when it becomes available to process the access request to the SDRAM outputted to the access request (4).

Moreover, the SDRAM controller (500) outputs read data to be read out from the SDRAM (501) via data (504) to an access request source. Note that, in FIG. 5, the path to output data from the SDRAM controller (500) to the access request source is omitted.

The SDRAM (501) performs a read or write processing corresponding to the access requests outputted to the address (502) and the command (503). The read data read out from the SDRAM (501) in the read processing is outputted to the data (504). Note that, while a burst length in the read or write processing of the SDRAM (501) is set at 4 in the present embodiment, it is not limited to this and other burst lengths (e.g., 1 or 8) may be set.

Figure 2:
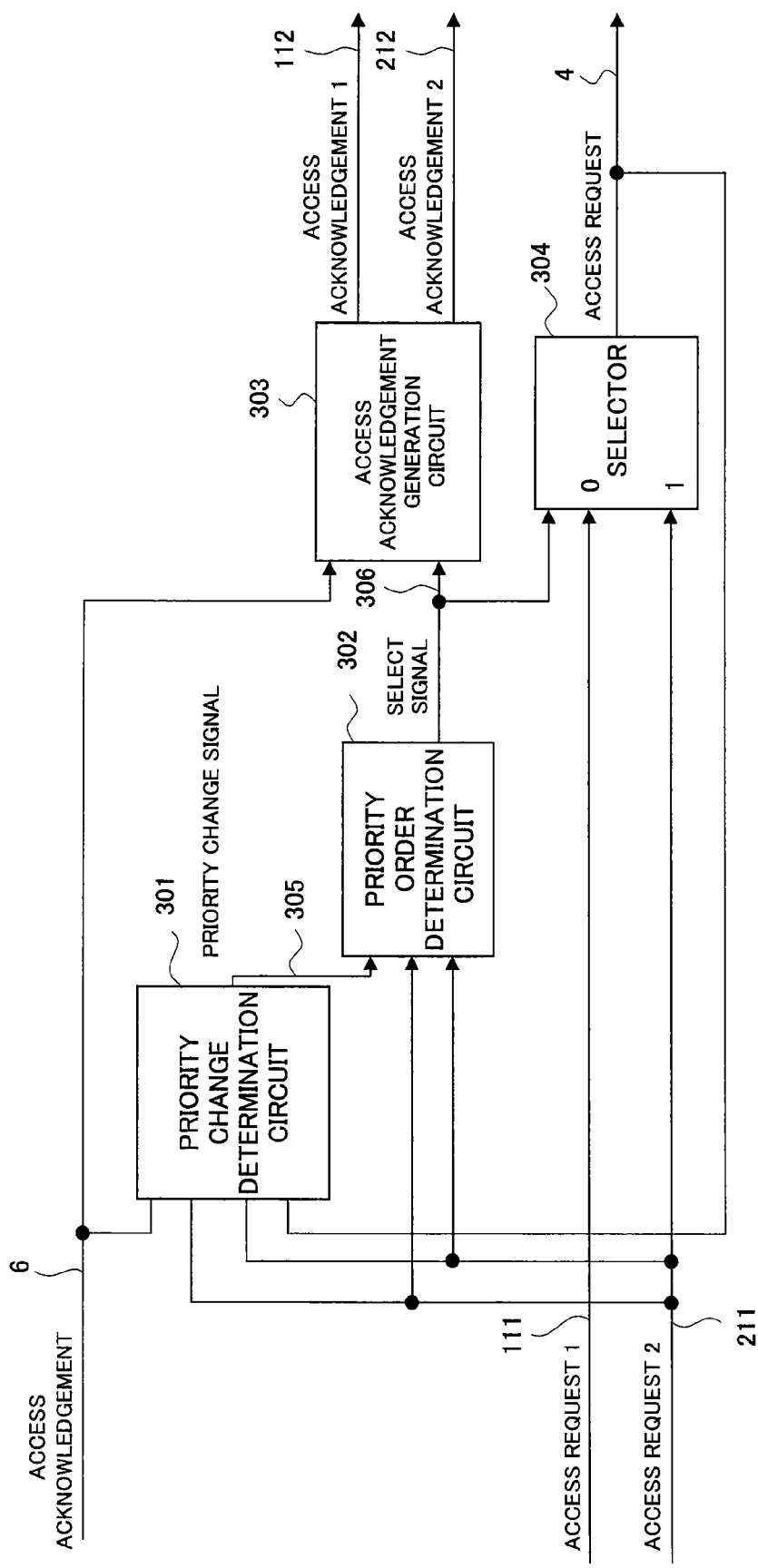
FIG. 2 is a detail view of an arbiter according to the first embodiment of the present invention.

FIG. 2 is a detail view showing the arbiter (3). The arbiter (3) comprises: a priority change determination circuit (301); a priority order determination circuit (302); an access acknowledgment generation circuit (303), a selector (304) and so forth.

The priority change determination circuit (301) gets the access acknowledgment (6), the access request 1 (111), the access request 2 (211), and the access request (4) inputted thereto, and outputs a priority change signal (305) indicating whether the priority order is changed or not (1: change the priority order, 0: not change the priority order). Details of the priority change determination circuit (301) will be described later in FIG. 3.

The priority order determination circuit (302) gets the access request 1 (111), the access request 2 (211), and the priority change signal (305) inputted thereto, and outputs a select signal (306) (1: select access request 2, 0: select access request 1). A relationship between an input and an output of the priority order determination circuit (302) is shown in FIG. 6, and a priority determination such that the access request 1 (111) has a higher priority than the access request 2 (211) is performed when the priority change signal (305) is 0, and a priority determination with changed priority order such that the access request 2 (211) has a higher priority than the access request 1 (111) is performed when the priority change signal (305) is 1.

The selector (304) selects the access request 1 (111) when the outputted select signal (306) is 0, and selects the access request 2 (211) when the outputted select signal (306) is 1, then outputs the selected request to the access request (4).

The access acknowledgment generation circuit (303) gets the access acknowledgment (6) and the select signal (306) inputted thereto, and outputs the access acknowledgment 1 (112) and the access acknowledgment 2 (212). A relationship between an input and an output of the access acknowledgment generation circuit (303) is shown in FIG. 7, and when the access acknowledgment (6) is 1, the access acknowledgment on the side selected by the select signal (306) becomes 1.

Figure 3:
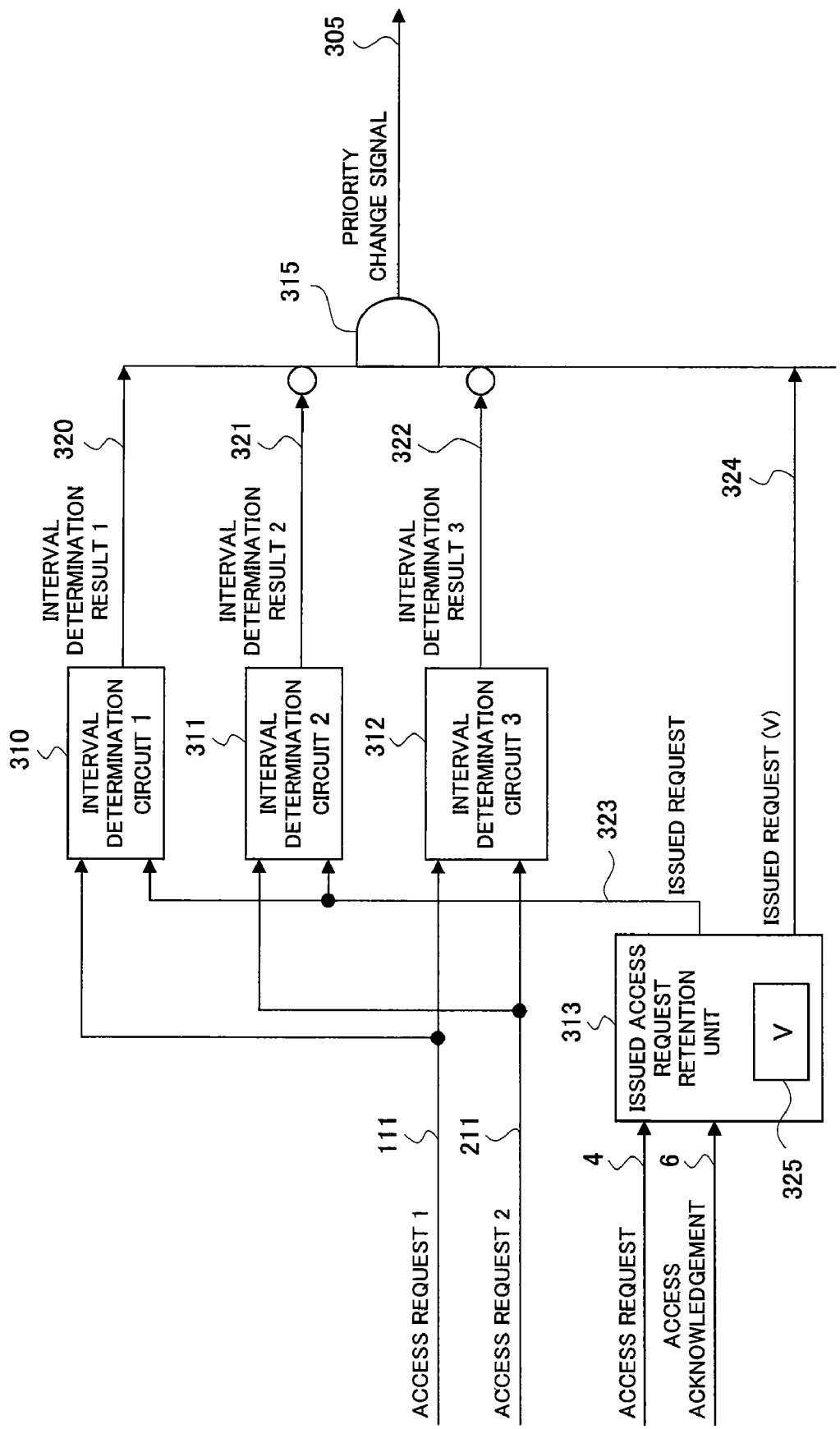
FIG. 3 is a detail view of a priority change determination circuit according to the first embodiment of the present invention.

FIG. 3 is a detail view showing the priority change determination circuit (301). The priority change determination circuit (301) comprises: an interval determination circuit 1 (310); an interval determination circuit 2 (311); an interval determination circuit 3 (312); an issued access request retention unit (313); an AND gate (315) and so forth.

The issued access request retention unit (313) retrieves an access request outputted to the access request (4) at timing of asserting the access acknowledgment (6). And, the issued access request retention unit (313) has a bit V (325) indicating whether the retained access request is valid or not (1: valid, 0: invalid), and the bit V is set to 1 at timing of retrieving a valid access request and is cleared to 0 when there is no request. Note that, the V (325) is cleared to 0 also when the priority change determination circuit (301) is initialized. Further, the issued access request retention unit (313) outputs the retrieved access request to an issued request (323), and outputs a value of the V (325) to the issued request (V) (324).

The interval determination circuit 1 (310) determines whether an interval is generated between an access processing in accordance with an access request outputted to the access request 1 (111) and an access processing in accordance with an access request outputted to the issued request (323), and outputs the determination result to an interval determination result 1 (320) (1: interval generated, 0: no interval generated).

The interval determination circuit 2 (311) determines whether an interval is generated between an access processing in accordance with an access request outputted to the access request 2 (211) and an access processing in accordance with an access request outputted to the issued request (323), and outputs the determination result to an interval determination result 2 (321) (1: interval generated, 0: no interval generated).

The interval determination circuit 3 (312) determines whether an interval is generated between an access processing in accordance with an access request outputted to the access request 1 (111) and an access processing in accordance with an access request outputted to the access request 2 (211), and outputs the determination result to an interval determination result 3 (322) (1: interval generated, 0: no interval generated).

The interval determination circuit 1 (310), interval determination circuit 2 (311), and interval determination circuit 3 (312) have a same configuration, and the circuit configuration will be described with reference to FIG. 4 with exemplifying the interval determination circuit 1 (310).

The AND gate (315) outputs a logic AND of an output of interval determination result 1 (320), an inverted output of the interval determination result 2 (321), an inverted output of the interval determination result 3 (322), and an output of the issued request (V) (324) to the priority change signal (305).

Figure 4:
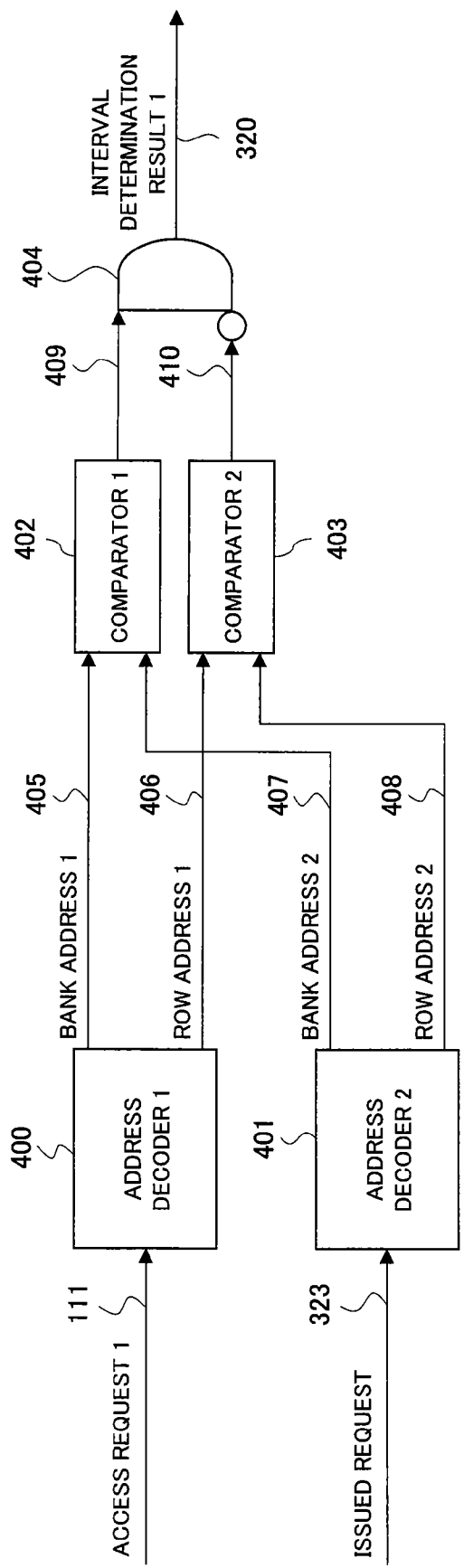
FIG. 4 is a detail view of an interval determination circuit 1 according to the first embodiment of the present invention.

FIG. 4 is a detail view of the interval determination circuit (310). The interval determination circuit 1 (310) comprises an address decoder 1 (400), an address decoder 2 (401); a comparator 1 (402); a comparator 2 (403); an AND gate (404); and so forth.

The address decoder 1 (400) extracts a bank address and row address from an access request outputted to the access request 1 (111), and outputs the same to a bank address 1 (405) and the row address 1 (406), respectively.

The address decoder 2 (401) extracts a bank address and row address from an access request outputted to the issued request (323), and outputs the same to a bank address 2 (407) and the row address 2 (408), respectively.

The comparator 1 (402) compares output values of the bank address 1 (405) and the bank address 2 (407), and outputs a comparison result to a signal (409) (1: match, 0: mismatch).

The comparator 2 (403) compares output values of the row address 1 (406) and the row address 2 (408), and outputs a comparison result to a signal (410) (1: match, 0: mismatch).

The AND gate (404) outputs a logical AND of the outputted signal (409) and an inverted output of the signal (410) to the interval determination result 1 (320).

An operation example of the access arbitration equipment of the present embodiment described above with reference to FIG. 1 to FIG. 7 will be described with reference to FIGS. 8A, 8B and FIG. 10.

Figure 10:
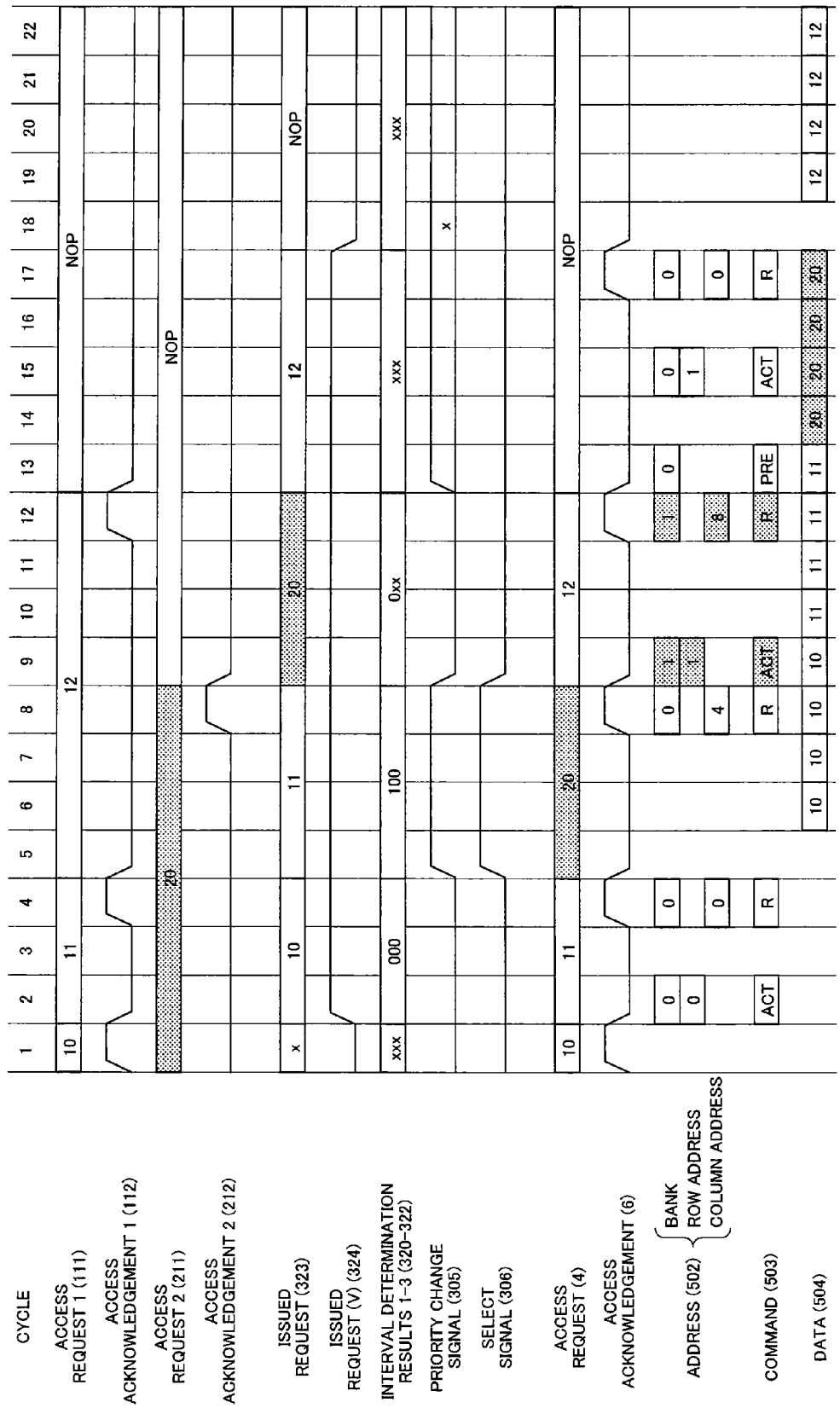
FIG. 10 is a timing chart showing an arbitration operation according to the first embodiment of the present invention.

FIGS. 8A and 8B show storing states of access requests in the access queue 1 (1), and the access queue 2 (2) upon starting an access arbitration operation to be described in detail in FIG. 10.

To the access queue 1 (1), the following access requests are stored in order from the first (head).

No. 1: identifier=10, bank=0, row address=0, column address=0

No. 2: identifier=11, bank=0, row address=0, column address=4

No. 3: identifier=12, bank=0, row address=1, column address=0

Same bank and different row addresses are given between access processings corresponding to the respective access requests of identifier=11 and identifier=12, and thus an idle cycle is generated along with replacement at row data. Note that, the identifier of access request is added for convenience of description, and is not always necessary to be mounted.

To the access queue 2 (2), the following access request is stored in order from the first (head).

No. 1: identifier=20, bank=1, row address=1, column address=8

Prior to a description about an operation according to the access arbitration equipment of the present embodiment with reference to FIG. 10, for comparison, an operation according to an arbitration system by a fixed priority order will be described with reference to FIG. 9.

Figure 9:
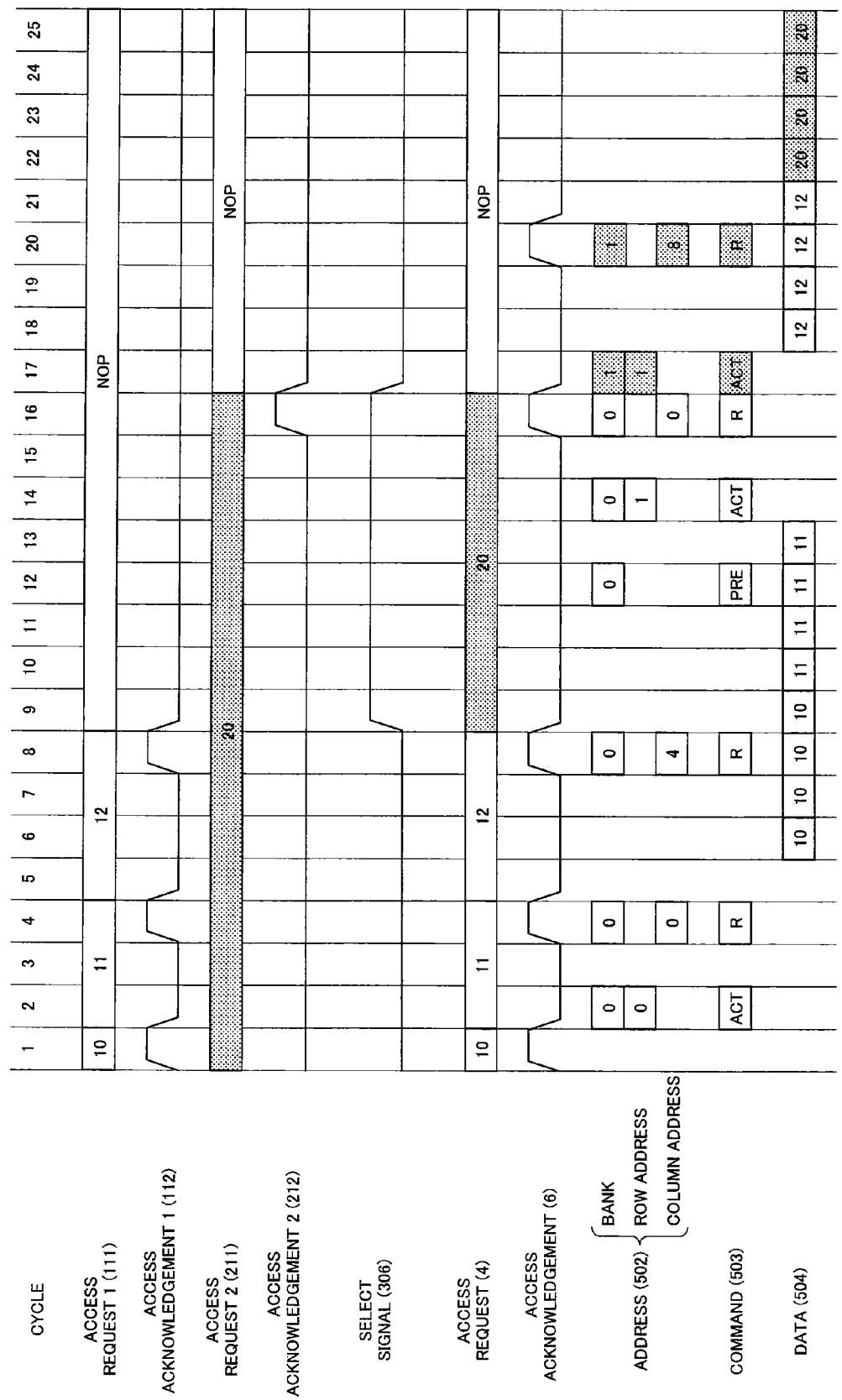
FIG. 9 is a timing chart showing an arbitration operation according to a fixed priority order according to a comparative technique of the first embodiment of the present invention.

FIG. 9 is a timing chart of an arbitration operation according to a fixed priority order. Note that, the arbitration system described in FIG. 9 can be realized by fixing the priority change signal (305) to 0 in the present embodiment. In addition, upon starting the access request arbitration operation, storing states of access requests of the access queue 1 (1) and access queue 2 (2) are as those shown in FIG. 8.

First, in a cycle 1, an access request of identifier=10 is outputted to the access request 1 (111), and an access request of identifier=20 is outputted to the access request 2 (211). Note that, the access request outputted from the access queue 2 (2) and the access request (4) accordingly generated, the address (502) of SDRAM, the command (503), the data (504) are shown by dot presentation. As a result of the arbitration, according to the fixed priority order (where an access request outputted to the access request 1 (111) has a higher priority than that of an access request outputted to the access request 2 (211)), the access request outputted to the access request 1

(111) is selected, thereby outputting the access request of identifier=10 to the access request (4). And, in the same cycle, the access acknowledgment (6) is asserted, thereby acknowledging the access request of identifier=10 outputted to the access request (4). Further, the access acknowledgment 1 (112) corresponding to the source of the acknowledged access request is asserted.

Next, in a cycle 2, corresponding to the access request of identifier=10 acknowledged in cycle 1, bank=0 and row address=0 are outputted to the address (502), thereby outputting an activate command (ACT) to the command (503). And, an access request of identifier=11 is outputted to the access request 1 (111) in the same cycle, and as a result of the arbitration, an access request to be outputted to the access request 1 (111) is selected, thereby outputting the access request of identifier=11 to the access request (4).

Next, in a cycle 4, corresponding to the access request of identifier=10 acknowledged in cycle 1, bank=0, row address=0 are outputted to the address (502), thereby outputting a read command (R) to the command (503). And, in the same cycle, the access acknowledgment (6) is asserted, thereby acknowledging the access request of identifier=11 outputted to the access request (4) is acknowledged. Further, the access acknowledgment 1 (112) corresponding to the source of the acknowledged access request is asserted. Note that, the system of the SDRAM controller (500) of the present embodiment is such that it becomes available to process an access request to the next SDRAM in the cycle of outputting the read command (R) or a write command (W) along with the previously acknowledged access request so that the access acknowledgement (6) is asserted.

Next, in cycle 5, an access request of identifier=12 is outputted to the access request 1 (111), and an access request outputted to the access request 1 (111) is selected as a result of arbitration, thereby outputting an access request of identifier=11 to the access request (4).

Next, in cycle 6, output to the data (504) of read data corresponding to the access request of identifier 10 acknowledged in cycle 1 is started, and it is continued until cycle 9.

Next, in cycle 8, corresponding to the access request of identifier=11 acknowledged in cycle 4, bank=0 and column address=4 are outputted to the address (502), thereby outputting read command (R) to the command (503). And, in the same cycle, the access acknowledgment (6) is asserted, thereby acknowledging the access request of identifier=12 outputted to the access request (4) is acknowledged. Further, the access acknowledgment 1 (112) corresponding to the source of the acknowledged access request is asserted.

Next, in cycle 9, NOP (No Operation) indicating that there is no access request is outputted to the access request 1 (111), and an access request outputted to the access request 2 (211) is selected as a result of arbitration, thereby outputting an access request of identifier=20 to the access request (4).

Next, in cycle 10, output to the data (504) of read data corresponding to the access request of identifier=11 acknowledged in cycle 4 is started, and it is continued until cycle 13.

Next, in cycle 12, bank=0 is outputted to the address (502), thereby outputting a precharge command (PRE) to the command (503). In the following cycle 14, corresponding to the access request of identifier=12 acknowledged in cycle 8, bank=0 and row address=1 are outputted to the address (502), thereby outputting an activate command (ACT) to the command (503). This case is such that the row data retained in the SDRAM is replaced because the access request of identifier=11 acknowledged in cycle 4 and the access request of identifier=12 acknowledged in cycle 8 are accesses to different rows of a same bank.

Next, in cycle 16, corresponding to the access request of identifier=12 acknowledged in cycle 8, bank=0 and column address=0 are outputted to the address (502), thereby outputting read command (R) to the command (503). And, in the same cycle, the access acknowledgement (6) is asserted, thereby acknowledging the access request of identifier=20 outputted to the access request (4). Further, the access acknowledgment 1 (212) corresponding to the source of acknowledged access request is asserted.

Next, in cycle 17, NOP is outputted to the access request 2 (211), and an access request outputted to the access request 1 (111) is selected as a result of arbitration, thereby outputting NOP to the access request (4). And, in the same cycle, corresponding to the access request of identifier=20 acknowledged in cycle 16, bank=1 and a row address=1 are outputted to the address (502), thereby outputting activate command (ACT) to the command (503).

Next, in cycle 18, output to the data (504) of read data corresponding to the access request of identifier=12 acknowledged in cycle 8 is started, and it is continued until cycle 21.

Next, in cycle 20, corresponding to the access request of identifier=20 acknowledged in cycle 16, bank=1 and columns address=8 are outputted to the address (502), thereby outputting read command (R) to the command (503).

Next, in cycle 22, output to the data (504) of read data corresponding to the access request of identifier=20 acknowledged in cycle 16 is started, and it is continued until cycle 25.

FIG. 10 is a timing chart of access arbitration operation of the access arbitration equipment according to the present embodiment which has been described in FIG. 1 to FIG. 7. Note that, upon starting the access request arbitration operation, the states of storing the access requests in the access queue 1 (1) and access queue 2 (2) are as those shown in FIGS. 8A and 8B. And, the access requests outputted to the access request (4) and corresponding respective inputs/outputs of the address (502), command (503), and data (504) of the SDRAM are performed by the same operation as described in FIG. 9, and thus detailed descriptions in FIG. 10 are omitted.

First, in cycle 1, an access request of identifier=10 is outputted to the access request 1 (111), and an access request of identifier=20 is outputted to the access request 2 (211). And, in the same cycle, an access arbitration is performed by the priority change determination circuit (301) and the priority order determination circuit (302). In this cycle, output of an issued request (323) is indefinite "x" (in the present embodiment, indefiniteness is denoted by "x"), and accordingly, output of interval determination result 1-3 (320-322) becomes "xxx". Meanwhile, an issued request (V) (324) has become 0 by initialization, and output of the priority change signal (305) which is output of the AND gate (315) shown in FIG. 3 is masked and so is 0. Further, by the respective outputs of the access request 1 (111), access request 2 (211), access priority change signal (305), 0 (zero) is outputted to the select signal (306) according to the relationship of input/output of the priority order determination circuit (302) shown in FIG. 6. As a result of the foregoing, the access request outputted to the access request 1 (111) is selected, thereby outputting the access request of identifier=10 to the access request (4). Further, in the same cycle, the access acknowledgment (6) is asserted, thereby acknowledging the access request of identifier=10 outputted to the access request (4). Moreover, the access acknowledgment 1 (112) corresponding to the source of the acknowledged access request is asserted.

Next, in cycle 2, an access request of identifier=11 is outputted to the access request 1 (111). And, in the same cycle, the access request of identifier=10 acknowledged in cycle 1 is retained in the issued access request retention unit (313), thereby outputting the access request of identifier=10 to the issued request (323), and outputting 1 to the issued access request (V) (324). Further, according to respective outputs of the access request 1 (111), access request 2 (211) and the issued request (323), output of the interval determination results 1-3 (320-322) becomes "000" by the interval determination circuits 1-3 (310-312) described in FIG. 4 in detail. Moreover, according to respective outputs of the interval determination result 1-3 (320-322) and issued request (V) (324), a logical AND is operated by using the AND gate (315) described in FIG. 3, and output of the priority change signal (305) becomes 0. As a result of the foregoing, according to the input/output relationship of the priority order determination circuit (302) shown in FIG. 6, an access request whose output is 0 and is outputted to the access request 1 (111) is selected to the select signal (306), and the access request of identifier=11 is outputted to the access request (4).

Next, in cycle 4, the access acknowledgment (6) is asserted, thereby acknowledging the access request of identifier=11 outputted to the access request (4). Further, the access acknowledgment 1 (112) corresponding to the source of the acknowledged access request is asserted.

Next, in cycle 5, an access request of identifier=12 is outputted to the access request 1 (111). Further, in the same cycle, the access request of identifier=11 acknowledged in cycle 4 is retained in the issued access request retention unit (313), thereby outputting the access request of identifier=11 to the issued access request (323), and outputting 1 to the issued request (V) (234). Moreover, according to respective outputs of the access request 1 (111), access request 2 (211) and issued request (323), output of the interval determination results (320-322) becomes "100" by the interval determination circuits 1-3 (310-312) described in FIG. 4. This means that a processing of the previously acknowledged access request and that of the access request outputted to the access request 1 (111) have an idle cycle therebetween, the processing of the previously acknowledged access request and that of the access request outputted to the access request 2 (211) have no idle cycle therebetween, and a processing of the access request outputted to the access request 1 (111) and that of the access request outputted to the access request (211) have no idle cycle therebetween.

Further, according to respective outputs of the interval determination results 1-3 (320-322) and issued request (V) (324), a logical AND is operated by using the AND gate (315) described in FIG. 3, and output of the priority change signal (305) becomes 1. This means that the priority is changed in the current arbitration. As a result of the foregoing, priority change is performed according to the input/output relationship of the priority order determination circuit (302), thereby outputting 1 to the select signal (306). Accordingly, the access request outputted to the access request 2 (111) is selected, and the access request of identifier=20 is outputted to the access request (4).

Next, in cycle 8, the access acknowledgment (6) is asserted, thereby acknowledging the access request of identifier=20 outputted to the access request (4). Further, the access acknowledgment 2 (212) corresponding to the source of the acknowledged access request is asserted.

Next, in cycle 9, NOP is outputted to the access request 2 (211). After this, the access request becomes only the access request of identifier=12 outputted to the access request 1 (111), and acknowledgment and processing of this access request will be progressed.

According to the foregoing, by the access arbitration achieved by the circuits described in FIG. 2 to FIG. 4 in detail, in an interval between the identifier=11 and identifier=12 which are high-priority, the access processing of the identifier=20 which is low-priority is inserted. In this manner, as compared with the arbitration system whose operation is descried in FIG. 9, the access processing of the low-priority identifier=20 is reduced by 8 cycles. On the other hand, as compared with the arbitration system whose operation is described in FIG. 9, while the access processing of the identifier=12 is delayed, the delay is suppressed to 1 cycle.

Figure 11:
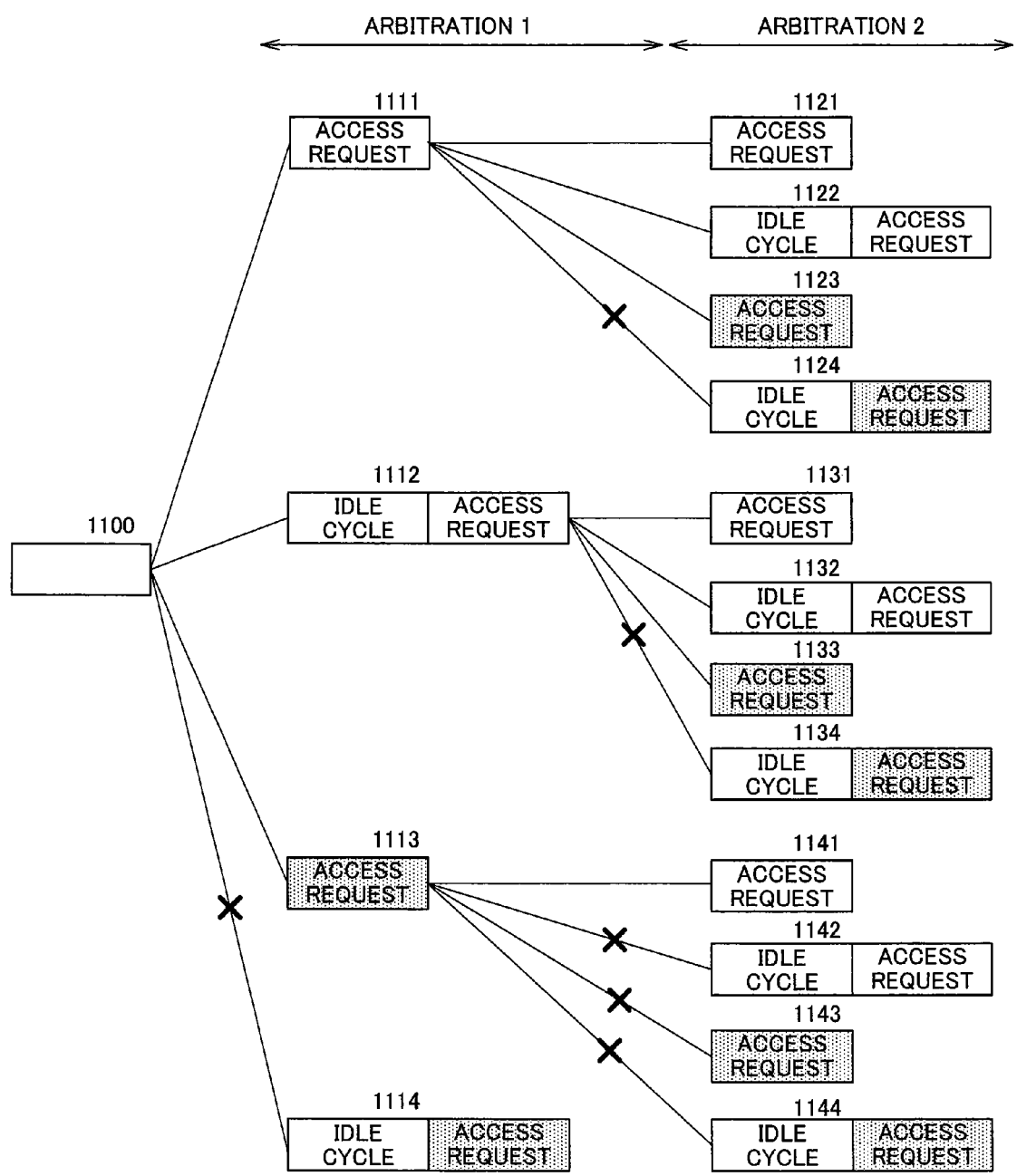
FIG. 11 is a diagram showing exhaustive orders of access requests selected as a result of an access arbitration by an ordered tree, in the case where access requests are constantly outputted to an access request 1 and an access request 2, according to the first embodiment of the present invention.

FIG. 11 is a diagram exhaustively showing orders of access requests selected as a result of an access arbitration achieved by the circuits described in FIG. 2 to FIG. 4 in detail by an ordered tree, in the case where access requests are constantly outputted to the access request 1 (111) and access request 2 (211). Paths which can exist will be described in the following.

As to a path from a node 1111 to a node 1124, a path from a node 1112 to a node 1134, and a path from a node 1100 to a node 1114, output of the interval determination result 2 (321) becomes 1 in each arbitration of arbitrations 1-2. As a result, output of the priority change signal (305) becomes 0, and thus the access request outputted to the access request 2 (211) will not be selected. Therefore, these paths do not exist.

On a path starting from a node 1113, since a priority change is generated in the arbitration 1, output of the interval determination result 3 (322) is 0. More particularly, this means that there is no idle cycle between a processing of the access request outputted to the access request 2 (211) and that of the access request outputted to the access request 1 (111), and further the access request outputted to the access request is queued. Accordingly, in the following next arbitration 2, an access request which does not have an idle cycle between itself and a processing of an access request just previously acknowledged is outputted to the access request 1 (111), and thus output of the interval determination result 1 (320) is 0 and no priority change is generated so that it is limited to a path from the node 1113 to a node 1141.

As to terminal nodes of the paths which can exist described above, the nodes 1121, 1131, 1141 trace back to the node 1111, the nodes 1122, 1132 trace back to the node 1112, and the nodes 1123, 1133 trace back to the node 1113, respectively.

In consideration of all the combinations of orders of access requests described above, in the case where access requests are continuously outputted to the access request 1 (111) and access request 2 (211), by using the access arbitration achieved by using the circuits described in FIG. 2 to FIG. 4 in detail, generation of idle cycle by priority change and continuous priority changes are suppressed, thereby preventing processing delay of high-priority access requests due to priority change.

Second Embodiment

A configuration diagram of an information equipment which includes an access arbitration equipment using an access arbitration system of a second embodiment of the present invention (hereinafter, mentioned as arbitration system 2) is same with FIG. 16 described in the first embodiment, and therefore the description thereof will be omitted herein.

An entire view of an access arbitration equipment using the access arbitration system 2 is same with FIG. 1 described in the first embodiment except the description of the arbitration control register (7), and therefore the description herein is limited to a description of the arbitration control unit (7).

An arbitration system/method of access request of the arbiter (3) is selected by a value stored in the arbitration control register (7). An example of a correspondence between a value stored in the arbitration control register (7) and a system/method to be selected is as follows.

| Stored Value in the Arbitration Control Register (7) | Access Request Arbitration System/Method |
|---|---|
| 0 | Priority system |
| 1 | Round-Robin system |
| 2 | Access arbitration system 2 |

Note that, other variations of arbitration system than the access arbitration system 2 and other correspondences of a value stored in the arbitration control register (7) and various arbitration methods are not limited to this example.

While details of the arbiter (3) will be described later with reference to FIG. 12, among arbitration methods to be selected according to the value stored in the arbitration control register (7), only a configuration to achieve the access arbitration system 2 will be described therein, and configurations to achieve other configurations than this will be omitted herein.

Figure 12:
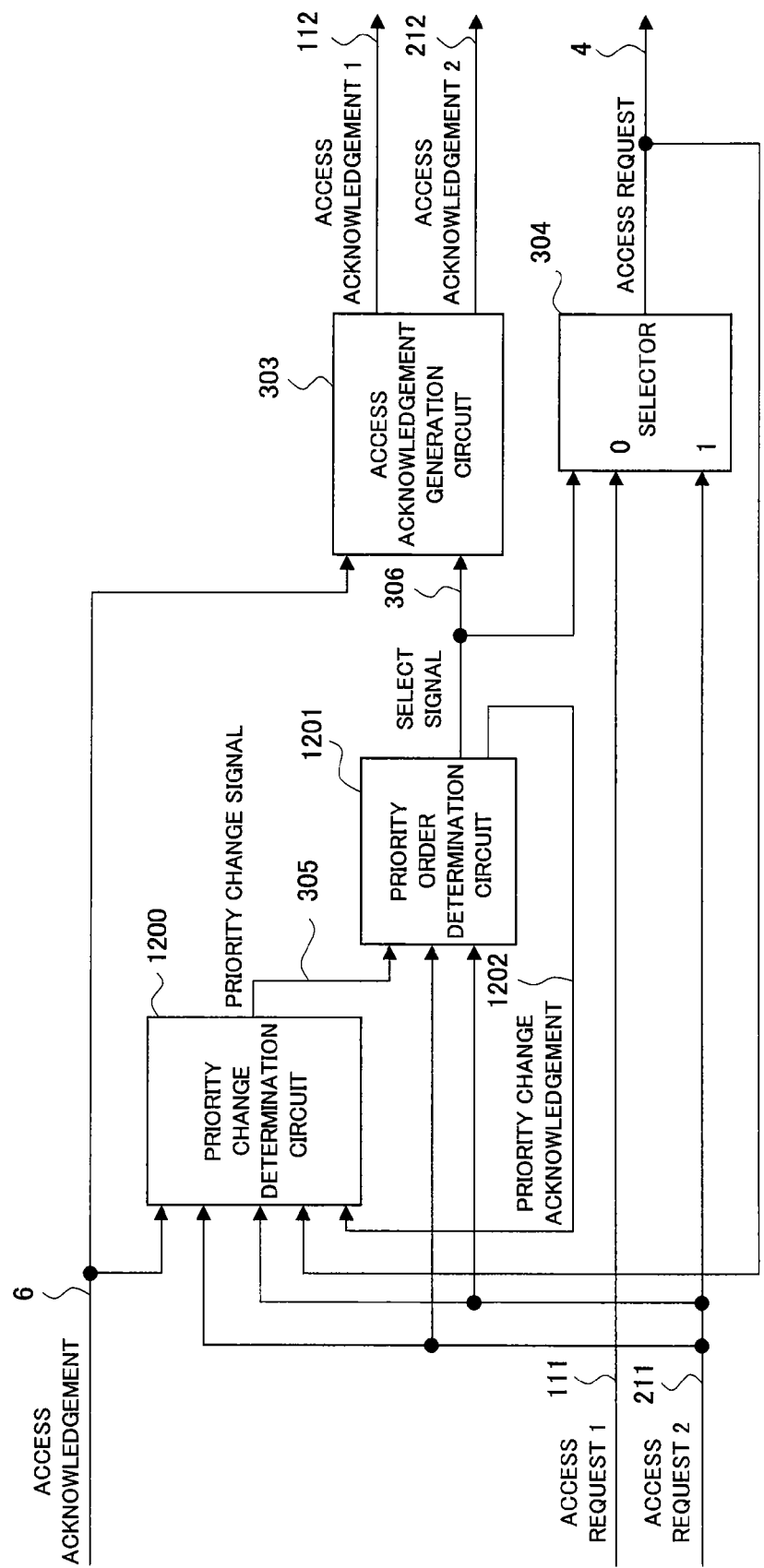
FIG. 12 is a detail view showing an arbiter according to a second embodiment of the present invention.

FIG. 12 is a detailed view of an arbitration circuit (3). The arbitration circuit (3) comprises: a priority change determination circuit (1200); a priority order determination circuit (1201); the access acknowledgment generation circuit (303); and the selector (304), and so forth.

The priority change determination circuit (1200) outputs the priority change signal (305) indicating whether the priority order is changed or not (1: change priority order, 0: not change priority order) taking inputs of the access acknowledgment (6), access request 1 (111), access request 2 (211), access request (4), and a priority change acknowledgment (1202). Details of the priority change determination circuit (1200) will be described in FIG. 13.

The priority order determination circuit (1201) gets the access request 1 (111), access request 2 (211), and priority change signal (305) inputted thereto, and outputs the select signal (306) (1: select access request 2, 0: select access request 1), and the priority change acknowledgment (1202). A relationship of input and output of the priority order determination circuit (1201) is such as shown in FIG. 14 that a priority determination to make the access request 1 (111) have a higher priority than that of the access request 2 (211) is performed when the priority change signal (305) is 0, and a priority determination to make the access request 2 (211) have a higher priority than that of the access request 1 (111) when the priority change signal (305) is 1 by changing the priority. When the priority is changed, 1 is outputted to the priority change acknowledgment (1202).

Descriptions of the selector (304) and the access acknowledgment generation circuit (303) are same with those of FIG. 2 in the first embodiment, and thus they are omitted herein.

Figure 13:
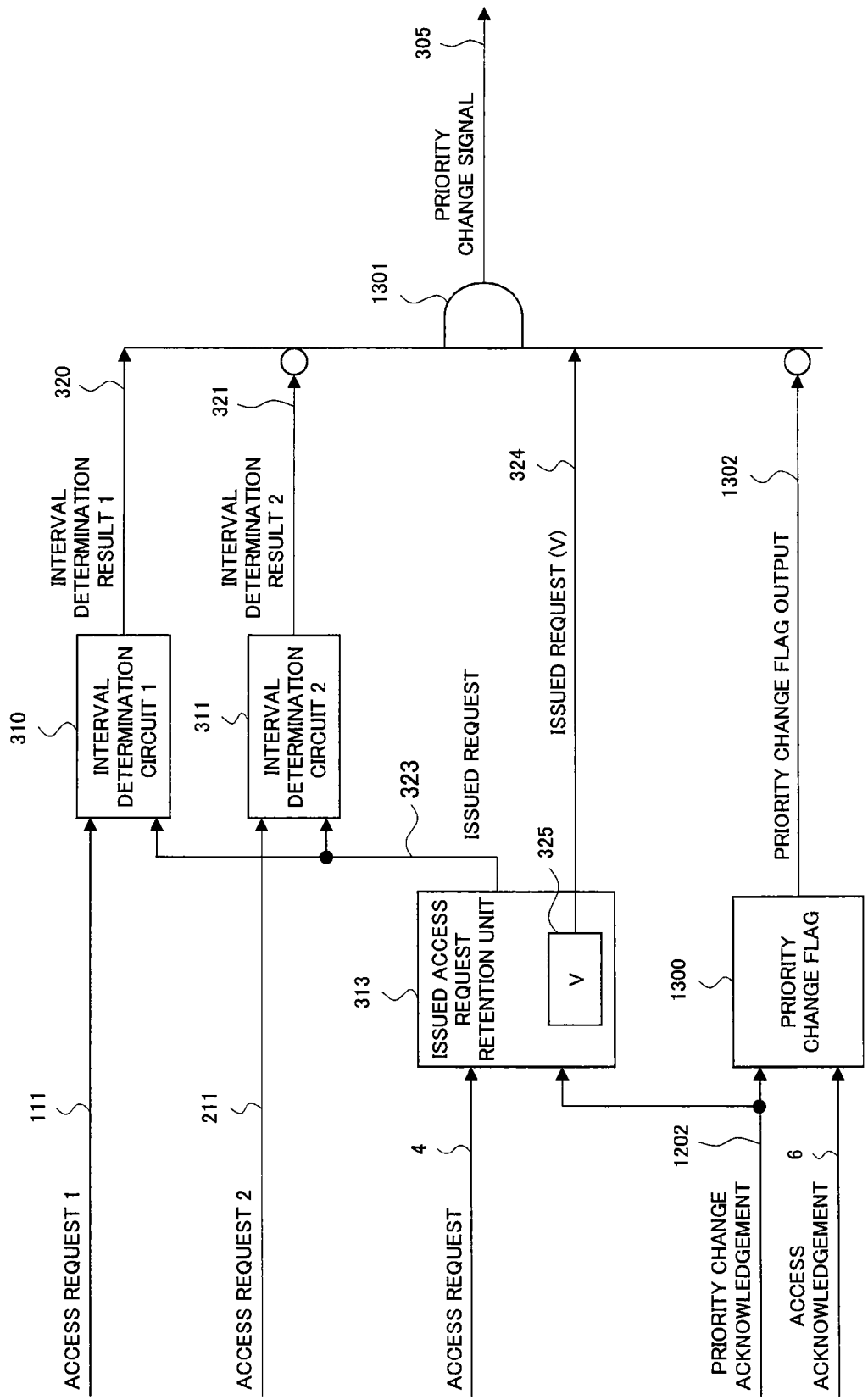
FIG. 13 is a detail view showing a priority change determination circuit according to the second embodiment of the present invention.

FIG. 13 is a detailed view of the priority change determination circuit (1200). The priority change determination circuit (1200) comprises: the issued access request retention unit (313); the interval determination circuit (310); the interval determination circuit 2 (311); a priority change flag (1300); and an AND gate (1301), and so forth.

Descriptions of the issued access request retention unit (313), the interval determination circuit (310) and the interval determination circuit 2 (311) are same with those of FIG. 3 in the first embodiment, and thus they are omitted herein.

The priority change flag (1300) retrieves output of the priority change acknowledgment (1202) at a timing of asserting the access acknowledgment (6), and outputs the value to a priority change flag output (1302). And, the priority change flag (1300) is cleared to 0 when the priority change determination circuit (1200) is initialized.

The AND gate (1301) outputs a logic AND of output of the interval determination result 1 (320), inverted output of the interval determination result 2 (321), output of the issued request (V) (324), and inverted output of the priority change flag output (1302) to the priority change signal (305).

As described above, according to the access arbitration system achieved by the circuits descried in FIG. 12 and FIG. 13, by priority change control using a determination of an idle cycle between access processings by means of the interval determination circuits 1-2, as same with FIG. 10 of the first embodiment, a low-priority access request is inserted when an interval is generated between processings of high-priority access requests, thereby reducing processing time of low-priority access requests with suppressing delay of processings of high-priority access requests.

FIG. 15 exhaustively shows orders of access requests selected as a result of an access arbitration achieved by the circuits described in FIG. 12 and FIG. 13 in detail by an ordered tree, in the case where access requests are constantly outputted to the access request 1 (111) and the access request 2 (211). Paths which can exist will be described below.

As to a path from the node 1111 to the node 1124, a path from the node 1112 to the node 1134, a path from the node 1113 to the node 1144, and a path from a node 1100 to a node 1114, output of the interval determination result 2 (321) becomes 1 in each arbitration of arbitrations 1-2. As a result, output of the priority change signal (305) becomes 0, and thus the access request outputted to the access request 2 (211) will not selected. Therefore, these paths do not exist.

On the path from the node 1113 to the node 1143, 1 is set to the priority change flag (1300) after the arbitration 1 is finished, and an output value of the priority change flag output (1302) becomes 1 in the arbitration 2. As a result, output of the priority change signal (305) becomes 0, and thus the access request outputted to the access request 2 (211) is not selected. Therefore, this path does not exist.

As to terminal nodes of the paths which can exist described above, the nodes 1121, 1131, 1141 trace back to the node 1111, the nodes 1122, 1132, 1142 trace back to the node 1112, and the nodes 1123, 1133 trace back to the node 1113, respectively.

In consideration of all the combinations of orders of access requests described above, in the case where access requests are continuously outputted to the access request 1 (111) and access request 2 (211), by using the access arbitration achieved by the circuits described in FIG. 12 and FIG. 13 in detail, generation of idle cycle by priority change is suppressed to one cycle or less, and continuous priority changes are suppressed, thereby preventing processing delay of high-priority access requests due to priority change.

In the foregoing, the invention made by the inventors of the present invention has been concretely described based on the embodiments. However, it is needless to say that the present invention is not limited to the foregoing embodiments and various modifications and alterations can be made within the scope of the present invention.

The access arbitration techniques of the present invention are applicable to a technique which takes an access request as a read or write request to an SDRAM in an SoC as an example of a semiconductor equipment formed on a semiconductor substrate. The present invention is not limited this, and it is applicable to other access requests.

What is claimed is:

1. An access arbitration circuit performing an arbitration between a plurality of access requests when a plurality of access requests having different priorities are generated, the access arbitration circuit comprising:
an issued access request retention unit which retains an issued access request selected as a result of a previous arbitration;
a first interval determination circuit coupled to the issued access request retention unit, the first interval determination circuit being adapted to determine whether an interval is generated between an issued access processing generated by the issued access request retained by the issued access request retention unit and a first access processing generated by a first access request having the highest priority among the plurality of access requests;
a second interval determination circuit, coupled to the issued access request retention unit, the second interval determination circuit being adapted to determine whether an interval is generated between the issued access processing and a second access processing generated by a second access request having a second-highest priority among the plurality access requests; and
a third interval determination circuit which determines whether an interval is generated between the second access processing and the first access processing,
wherein, in a case where the first interval determination circuit determines that an interval is generated between the issued access processing and the first access processing and the second interval determination circuit determines that no interval is generated between the issued access processing and the second access processing, a priority order of the first access request and the second access request are changed,
wherein, in a case where the third interval determination circuit determines that an interval is generated between the second access processing and the first access processing, the priority order of the first access processing and the second access processing is not changed, and
wherein a method of determining interval generation by the first interval determination circuit, the second interval determination circuit, and the third interval determination circuit extracts a bank address and a row address in an SDRAM access respectively from two access requests which are determination targets of the interval determination, and in a case where the two bank addresses are same and the two row addresses are not same, it is determined that an interval is generated between the two access requests.

2. The access arbitration circuit according to claim 1, further comprising a priority change flag which indicates whether a change of priority order has been made or not in the previous arbitration, and
wherein, in a case where the priority change flag indicates that there has been a change of the priority order in the previous arbitration, the priority order of the first access request and the second access request is not changed.

3. A semiconductor equipment wherein the access arbitration circuit according to claim 1 is formed on a semiconductor substrate.

4. An access arbitration method of an access arbitration circuit which performs an arbitration between the plurality of access requests in a case where a plurality of access requests having different priorities are generated,
wherein the access arbitration circuit:
retains an issued access request which is selected as a result of a previous arbitration;
determines whether an interval is generated between an issued access processing generated by the retained issued access request and a first access processing generated by a first access request having the highest priority among the plurality of access requests;
determines whether an interval is generated between the issued access processing and a second access processing generated by a second access request having a second highest-priority among the plurality access requests;
changes a priority order of the first access request and the second access request in a case where it is determined that an interval is generated between the issued access processing and the first access processing and it is determined that no interval is generated between the issued access processing and the second access processing,
wherein the access arbitration circuit further determines whether an interval is generated between the second access processing and the first access processing and does not change the priority order of the first access request and the second access request in a case where it is determined that an interval is generated between the second access processing and the first access processing, and
wherein a method of determining interval generation extracts a bank address and a row address in an SDRAM access respectively from two access requests which are determination targets of the interval determination, and in a case where the two bank addresses are same and the two row addresses are not same, the method determines that an interval is generated between the two access requests.

5. The access arbitration method according to claim 4,
wherein the access arbitration circuit does not further change the priority order of the first access request and the second access request in a case where a priority change flag indicating whether a change of priority order in a previous arbitration has been made or not indicates that there has been a change in the priority order in the precious arbitration.

* * * * *